(12) United States Patent
Ostersehlte (10) Patent No.: US 8,100,311 B2
(45) Date of Patent: Jan. 24, 2012

(54) FRICTION STIR WELDING HEAD AND METHOD FOR CONTROLLING A FRICTION STIR WELDING HEAD

(75) Inventor: Hartmut Ostersehlte, Bremen (DE)

(73) Assignee: Airbus Deutschland GmbH, Hamburg (DE)

(*) Notice: Subject to any disclaimer, the term of this patent is extended or adjusted under 35 U.S.C. 154(b) by 464 days.

(21) Appl. No.: 11/904,361

(22) Filed: Sep. 27, 2007

(65) Prior Publication Data

US 2008/0073409 A1 Mar. 27, 2008

(30) Foreign Application Priority Data

Sep. 27, 2006 (DE) .......................... 10 2006 045 523

(51) Int. Cl.
*B23K 20/12* (2006.01)
(52) U.S. Cl. ........................ 228/2.1; 228/112.1
(58) Field of Classification Search ............... 228/2.1, 228/112.1
See application file for complete search history.

(56) References Cited

U.S. PATENT DOCUMENTS

| 5,718,366 A * | 2/1998 | Colligan ............... 228/112.1 |
| 6,019,013 A * | 2/2000 | Luik ..................... 74/490.01 |
| 2004/0173663 A1* | 9/2004 | Okamoto et al. ........ 228/112.1 |

* cited by examiner

*Primary Examiner* — Jessica L Ward
*Assistant Examiner* — Nicholas D'Aniello
(74) *Attorney, Agent, or Firm* — Jenkins, Wilson, Taylor & Hunt, P.A.

(57) ABSTRACT

The invention relates to a friction stir welding head having a housing and a welding tool with a rotating welding pin and a rotating shoulder tool for welding workpieces which rest on a workpiece rest, with the shoulder tool, which rotates in synchronism with the welding pin, coaxially surrounding the welding pin. According to the invention, a first distance between a first laser rangefinder and a welding pin section $4a$ can be determined by means of the first laser rangefinder. This makes it possible to determine at least one change in the distance between the welding pin tip and the workpiece rest by means of a first laser rangefinder.

9 Claims, 4 Drawing Sheets

FRICTION STIR WELDING HEAD AND METHOD FOR CONTROLLING A FRICTION STIR WELDING HEAD

CROSS-REFERENCE TO RELATED APPLICATIONS

This application claims the benefit of German Patent Application No. 10 2006 045 523.1 filed on Sep. 27, 2006, the entire disclosures of which are herein incorporated by reference.

FIELD OF THE INVENTION

The invention relates to a friction stir welding head having a housing and a welding tool with a rotating welding pin and a rotating shoulder tool for welding work pieces which rest on a work piece rest, with the shoulder tool, which rotates in synchronism with the welding pin, coaxially surrounding the welding pin.

The invention also relates to a method for open-loop control of a friction stir welding head.

BACKGROUND OF THE INVENTION

Friction stir welded joints which are in components have a virtually optimum joint structure in the bead formation area, which is virtually comparable to the original material characteristics of the components. The use of friction stir welding (FSW) for joining work pieces therefore makes it possible to produce weld beads which can be subjected to heavy loads and whose mechanical characteristics virtually correspond to those of the basic material. Known embodiments of apparatuses for friction stir welding have a friction stir welding head with a welding pin which rotates about its longitudinal axis and is coaxially surrounded by a shoulder tool which rotates in synchronism with the welding pin. Together with the shoulder tool, the welding pin forms the actual welding tool. In order to join two work pieces, for example in the form of two aluminum sheets, the rotating welding tool, comprising the welding pin and the shoulder tool, is moved along and through the abutment area between the two work pieces. The material of the two work pieces becomes plastic in the bead formation area as a result of the friction heat produced by the rotation of the welding tool. At the same time, the rotating welding pin mixes the material of the mutually abutting work pieces in the bead area.

The shoulder tool which rotates in synchronism with the welding pin is in this case moved parallel to the work piece upper face, and ensures that the bead has a flat surface.

In known apparatuses, the friction stir welding head can frequently be positioned with high accuracy, controlled by a CNC open-loop control system, with respect to the work pieces by means of a gantry arrangement, on at least three spatial axes.

The work pieces rest on a stable work piece rest. A narrow strip of metal (backing) is incorporated underneath the bead formation area in the work piece rest, and can quickly be replaced when it becomes worn. The work pieces are secured on the work piece rest by clamping apparatuses, in order to prevent the work pieces from being moved by the high mechanical forces which occur during the friction stir welding process.

The distance between the welding pin or the welding pin tip and the work piece rest, or the backing incorporated in it, is of critical importance to the quality of a weld bead produced using the friction stir welding method. If the distance is too short, this can lead to increased wear or failure of the welding pin. In contrast, if the distance is too long, the material will not be stirred completely by the welding pin, so that the components are not completely welded to one another in the rearward area of the weld bead, and the weld bead can break when subjected to a bending load. This results in a so-called "lack of penetration" (LOP) fault.

It is therefore of major importance for the achievable quality of a weld bead formed using the friction stir welding method to know as accurately as possible the vertical position of the welding head, at least with respect to the work piece rest or the backing (z-axis). Known gantry apparatuses for friction stir welding have a specific position measurement sensor for detection of the z-position of the welding head in space. However, since this measurement is carried out at a short distance from the welding area, it is not possible, for example, to determine heat-dependent length changes of the welding pin or bending of the gantry arrangement, for guidance of the welding head.

SUMMARY OF THE INVENTION

One object of the invention is to provide a welding head for friction stir welding in which it is possible to measure with high accuracy the distance between the welding pin or the welding pin tip and the work piece rest or the backing, while avoiding measurement errors resulting from thermal expansion of the welding pin, and any load-dependent geometry changes of the guidance apparatus for the friction stir welding head. In this case, the distance between the welding pin and the welding base or the backing should be detected with an accuracy of about ±0.05 mm, in order to achieve quality control of the friction stir weld beads that are produced.

This object is achieved by an apparatus having the features of Patent Claim 1.

Since a first laser rangefinder can be used to determine a first distance between the first laser rangefinder and a welding pin section, the actual distance between the welding pin or the welding pin end and the work piece rest or the backing can be determined with high accuracy irrespective of the position measurement system used in the friction stir welding installation, and can be measured independently of any thermally dependent change in the length of the welding pin. Load-dependent or position-dependent geometry changes of a numerically controlled gantry arrangement which is generally used for guiding the friction stir welding head can likewise be detected and taken into account for compensation purposes. The friction stir welding head according to the invention ensures exact detection of the movement of the welding pin during the friction stir welding process. Thermal and/or load-dependent changes in the length of the welding pin, which can lead to so-called "LOP" faults, can be detected directly, so that there is no need for subsequent eddy-current or ultrasound examinations of the weld bead, which in any case can reliably detect only "LOP" faults of more than a specific minimum size.

A further embodiment provides that the welding pin section is a reflector, which is arranged on the welding pin, for reflection of the laser radiation emitted by the first laser rangefinder, with the first laser rangefinder being arranged in the area of the housing. The welding pin section in the form of the reflector allows at least one change in the vertical position of the welding pin, and thus the distance between the welding pin tip and the welding base (backing) resulting from a thermally dependent change in the length of the welding pin to be detected.

A further embodiment of the friction stir welding head provides that the reflector is a metallic disc which essentially coaxially surrounds the shoulder tool, with the metallic disc being attached to the welding pin and its upper face reflecting the laser radiation emitted by the first laser rangefinder. This embodiment allows simple retrofitting or conversion of the welding pins which are normally used for friction stir welding, in order to determine the distance between the welding pin and the work piece rest. The upper face of the metallic disc is in this case used as a reflection plane for the first laser rangefinder. The first laser rangefinder therefore determines the distance between this reflection plane and the laser rangefinder itself.

A further embodiment provides that the shoulder tool has at least three elongated holes which are distributed uniformly around the circumference and through which respective attachment means, in particular in each case one attachment screw, can be inserted into an annular groove in the welding pin, for attachment of the metallic disc to the welding pin. This allows the metallic disc to be attached to the welding pin by means of a circumferential annular groove incorporated in the end area of the welding pin. There is therefore no need for any other physical modifications to the welding pin. This arrangement for attachment of the disc if required allows the metallic disc to be aligned with respect to the longitudinal axis of the welding pin. Ideally, the reflection plane of the metallic disc, that is to say its upper face, runs exactly at right angles to the longitudinal axis of the welding pin. In practice, such accurate alignment of the disc is not feasible, so that the metallic disc generally always carries out a tumbling movement, if only a slight tumbling movement, during rotation of the welding pin, and this leads to sinusoidally fluctuating measured values of the distance by the first laser rangefinder. By way of example, this measurement inaccuracy can be overcome by calculation by averaging or by some other suitable filter algorithms in the open-loop and closed-loop control device. The elongated holes furthermore allow unimpeded vertical movement of the welding pin, and of the metallic disc that is attached to it, with respect to the shoulder tool.

A further embodiment provides that the annular groove is arranged in a lower area of the welding pin. The attachment of the metallic disc in the lower area of the welding pin reduces the measurement error, in particular in the form of thermally dependent length changes of the welding pin.

A further embodiment provides that a second laser rangefinder can be used to measure a second distance between the housing and one of the work piece upper faces. This makes it possible to calculate the absolute distance between the welding pin tip and the work piece rest. Furthermore, in particular, it is possible to reliably identify geometry changes, for example in the form of load-dependent bending of a CNC-controlled gantry arrangement which is generally used for guiding the friction stir welding head.

A further embodiment provides that any change in the distance between the welding pin tip and the work piece rest can be determined from the first distance by means of an open-loop and closed-loop control device. The friction stir welding head according to the invention with at least one laser rangefinder allows high-precision determination of any change in the distance between the welding pin tip and the work piece rest or the backing, independently of any thermal expansion effects which may occur in the welding pin. For this purpose, a predetermined nominal value is first of all set for the distance between the welding pin tip and the work piece rest, and the first distance value supplied from the first laser rangefinder is set to a fixed initial value. Any change in the first distance during the friction stir welding process is measured, and is evaluated for quality assurance.

A further embodiment provides that the absolute distance between the welding pin tip and the work piece rest can be determined from the first and the second distance by means of the open-loop and closed-loop control device. In particular, this makes it possible to directly detect any geometry changes or minor deformation occurring in a CNC-controlled gantry arrangement which is normally used for guiding the friction stir welding head. Furthermore, the two distance values can be used to determine the absolute distance between the welding pin tip and the work piece rest, if appropriate including further position values of the welding pin along the z-axis which are passed on, for example, from a position measurement device in the friction stir welding head to the CNC control system. It may also be necessary to include further geometric data, such as the spatial dimensions of the friction stir welding head, of the gantry arrangement, the material thicknesses of the components to be welded, as well as the length of the welding pin in the calculation as well.

A further embodiment provides that the first laser rangefinder is arranged directly on the work piece rest, and the welding pin section is a conical disc which is in the form of a reflector, and whose conical edge reflects the laser radiation emitted in the horizontal direction by the first laser rangefinder. This makes it possible to detect any change in the position of the welding pin parallel to the z-axis, using only one laser rangefinder. The laser radiation emitted by the first laser rangefinder runs parallel to the work piece rest (xy-plane) and is reflected back to the first laser rangefinder by the conical edge, for distance measurement.

A further development of the friction stir welding head provides that any change in the distance between the welding pin tip and the work piece rest can be determined from the distance between the conical edge and the first laser rangefinder by means of the open-loop and closed-loop control device. The distance between the conical edge and the laser rangefinder varies in proportion to any vertical movement of the welding pin, because of the conical, inclined edge of the disc. It is therefore possible to determine any change in the position of the welding pin or of the welding pin tip in the vertical direction by measuring the respective horizontal distance between the inclined edge of the conical disc and the first laser rangefinder, which is arranged directly on the work piece rest. This can be done just by converting the respective horizontal distance change to the corresponding vertical position change of the welding pin, by trigonometric calculations. If the initial distance between the welding pin tip and the work piece rest is known, it is also possible to determine the absolute distance between the welding pin tip and the work piece rest, or the backing. This allows reliable quality assurance with regard to any "LOP" faults in the weld bead produced by the friction stir welding head according to the invention.

Furthermore, the object according to the invention is achieved by a friction stir welding head having the features of Patent Claim 5. Since a laser tracker is arranged directly on the work piece rest and at least the distance between a welding pin section and the work piece rest can be measured by means of the laser tracker, in order to determine the distance between the welding pin tip and the work piece rest, this results in the friction stir welding head according to the invention having a particularly simple design which does not require any major modifications to the welding tool and which, furthermore, allows the absolute distance between the welding pin tip and the work piece rest to be determined very accurately. A laser tracker can be used to determine the absolute position of a stationary or moving object in space with respect to its installation location, which in this case forms the work piece rest. This is dependent on a suitable reflector for reflecting the laser radiation emitted by the laser tracker being arranged on the object.

In consequence, the laser tracker can also be used to determine the position of the welding pin or of the welding pin section on the xy plane, that is to say parallel to the work piece rest. The inclusion of further measured values (for example the vertical position of the friction stir welding head parallel to the z-axis, which is known from a position measurement system for the CNC control system) or installation dimensions, which could increase the measurement uncertainty, is superfluous.

One embodiment provides for the welding pin section to be in the form of at least one reflector for reflection of the laser radiation emitted by the laser tracker, and for the shoulder tool to have at least one elongated hole for transmission of the laser radiation emitted by the laser tracker. This allows direct measurement of at least the vertical position of the welding pin. For this purpose, the laser tracker is arranged directly on the work piece rest of the friction stir welding apparatus. The welding pin section is formed by a reflector which is arranged adjacent to or on the welding pin and, in conjunction with the elongated holes arranged in the shoulder tool, for transmission of the laser radiation emitted by the laser tracker, makes it possible at least to detect the absolute vertical distance between the reflector and the work piece rest, which forms the reference point for the laser tracker. The absolute distance between the welding pin tip and the work piece rest can be calculated from the known distance between the reflector and the welding pin tip of the welding pin. The laser tracker also allows the exact position of the welding pin to be found when the incidence angle of the laser radiation used for measurement purposes changes to a major extent with respect to the optical reflector, and the laser radiation no longer strikes the reflector essentially at right angles. The laser beam from the laser tracker is also able to track virtually any path curve of the optical reflector.

A further embodiment provides for the at least one reflector to be arranged in a lower area of the welding pin. This embodiment allows a small measurement uncertainty in the determination of the vertical position of the welding pin, as a function of thermally dependent and/or load-dependent changes in the length of the welding pin.

Furthermore, the object according to the invention is achieved by a method for open-loop control of a friction stir welding head, in particular according to one of Patent Claims 1 to 9, having the following steps:
a) definition of a nominal value for the distance between the welding pin tip and the work piece rest,
b) setting of the distance to an initial value,
c) start of the friction stir welding process for joining the work pieces in the bead formation area by means of the welding tool,
d) measurement of the distance by means of at least one laser rangefinder,
e) lowering of the welding pin in the vertical direction when the currently measured distance is greater than the initial value,
f) raising of the welding pin in the vertical direction when the currently measured distance is less than the initial value, and
g) repetition of steps d) to f) until the friction stir welding process has been completed.

This procedure ensures that the distance between the welding pin tip and the work piece rest is kept largely constant. In this case, thermally dependent changes in the length of the welding pin are compensated for, and the relative change in the distance is thus detected so as to achieve a friction stir weld bead produced with optimum quality.

The absolute value of the distance between the welding pin tip and the work piece rest can be determined only by including a further laser rangefinder, which detects the distance between the work piece upper face and the friction stir welding head. Furthermore, for this purpose, it is also necessary to include the position of the friction stir welding head or of the welding pin in the vertical direction. This measured value may be provided, for example, by a position measurement sensor, which is contained in the CNC control system, for detecting the position of the welding pin parallel to the x-axis. This also makes it possible to detect changes in the vertical position of the friction stir welding head which are caused, for example, by undesirable deformation of a gantry arrangement that is used to guide the friction stir welding head and, if necessary, for them to be compensated for by readjustment of the position of the welding pin parallel to the x-axis.

BRIEF DESCRIPTION OF THE DRAWINGS

In the drawings.

Physically identical elements are provided with the same reference numbers in the drawing.

DETAILED DESCRIPTION OF THE INVENTION

Figure 1:
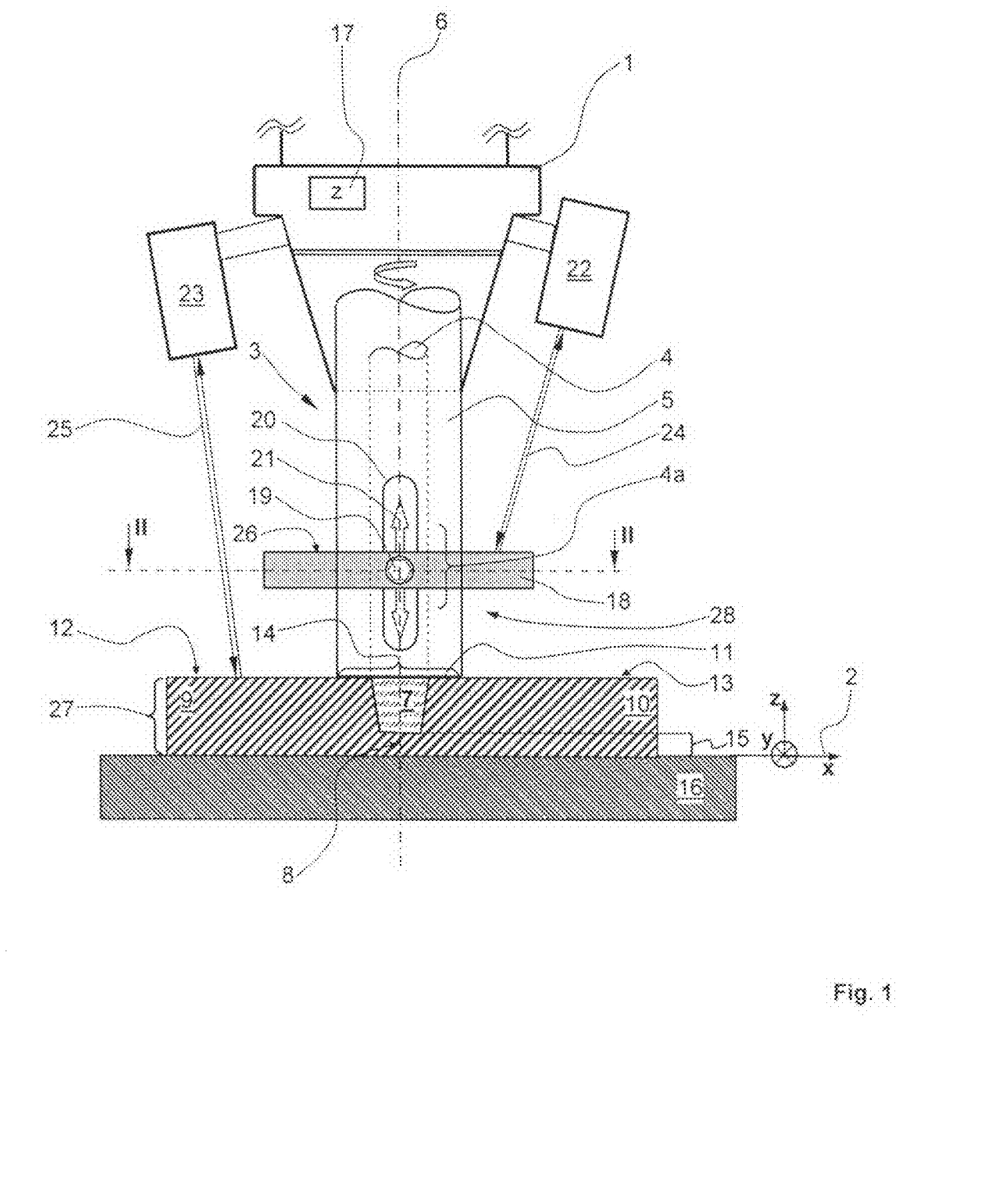
FIG. 1 shows a first embodiment variant of the friction stir welding head according to the invention.

FIG. 1 shows a first embodiment variant of the friction stir welding head. A housing 1 of the friction stir welding head is arranged on a guide arrangement, which is not illustrated but for example is in the form of a CNC-controlled gantry arrangement, for free positioning in three dimensions. The friction stir welding head can in this case be positioned in the direction of the x-axis, y-axis and z-axis, which are illustrated symbolically by the coordinate system 2, with high accuracy, and with a plurality of degrees of freedom if required. The welding tool 3 is held on the housing 1 of the friction stir welding head, in a chuck, which is not shown in any more detail, or in a spindle. The chuck or the spindle, together with the welding tool, rotate at high speed with respect to the welding head, which does not rotate with them. The welding tool comprises a welding pin 4 and a shoulder tool 5, which coaxially surrounds it. The welding pin 4 has a welding pin section 4a as a marking, thus allowing measurement of the distance between a laser rangefinder and the welding pin section 4a. The welding pin section 4a may be in the form of a reflector which reflects the laser radiation emitted by the laser rangefinder. Both the welding pin 4 and the shoulder tool 5 are held in the friction stir welding head such that they can rotate about a longitudinal axis 6. In this case, the welding pin 4, which is held in the chuck or in a spindle, and the shoulder tool 5 always rotate in synchronism. A welding pin tip 7 is located at the lower end of the welding pin 4 and enters the work pieces 9, 10 along a butt edge 8 of the work pieces 9, 10 to be welded.

The shoulder tool 5 has an essentially hollow-cylindrical geometric form. The welding pin 4 and the shoulder tool 5 are clamped detachably in the upper part of the housing 1. A shoulder 11 of the shoulder tool 5 rests on the work piece upper faces 12, 13, on both sides of the butt edge 8. The welding pin 4 and the shoulder tool 5 can be caused to rotate by means of a drive, which is not illustrated.

The work pieces 9, 10 can be plastically deformed in the bead formation area 14 by the large amount of friction heat produced by the rotary movement of the welding pin 4 and of the shoulder tool 5. During this process, the material of the work pieces 9, 10 is stirred by the rotary movement of the welding pin 4, forming the weld bead in the bead formation area 14. At the same time, the shoulder 11 is guided above the work piece upper faces 12, 13, resting on them, in order to achieve an essentially flat and smooth weld bead.

The welding head is guided with high precision, for example automatically by means of a CNC-controlled gantry arrangement, along the three spatial axes symbolized by the coordinate system 2. The CNC-controlled gantry arrangement can be used to produce virtually any desired weld bead profiles by guiding the welding stirring head along pre-programmed path curves. It is therefore even possible to join work pieces 9, 10 whose butt edge 8 has a curved profile by friction stir welding. In the exemplary embodiment illustrated in FIG. 1, the welding pin 4 is passed through the material of the work pieces 9, 10, until the friction stir weld bead has been completed, while accurately maintaining the distance 15 between a work piece rest 16 and the backing, which is not illustrated but is located underneath the bead formation area 14. The shoulder tool 5 is controlled depending on the force. The so-called backing is a metal strip with a rectangular cross section which is introduced into the work piece rest 16, sealing it and approximately flush with its upper face. The backing is used as an easily replaceable closure layer in the work piece rest 16, and may be formed from a heat-resistant metal.

The distance 15 between the welding pin tip 7 and the work piece rest 16 must be neither too great nor too small, but must be kept exactly at a predetermined nominal level. If the distance 15 is less than the nominal value, there is a risk of the welding pin 4 being damaged, or subject to increased wear, as a result of direct frictional contact with the work piece rest 16 or the backing. If, in contrast, the distance 15 is greater than the nominal value, the work pieces 9, 10 will not be welded all the way through, and there is a risk of fracture when a bending load is applied to the weld bead. This results in a so-called lack of penetration "LOP" fault in the bead formation area 14, and the friction stir weld bead is only of a relatively poor quality.

A position sensor 17, in particular for detecting the position of the welding pin 4 or of the friction stir welding head in the vertical direction (parallel to the z-axis) for CNC control of the friction stir welding apparatus, is also arranged in the area of the housing 1. However, the position sensor 17 cannot be used to detect any heat-dependent change in the length of the welding pin 4 with sufficient accuracy, since the position measurement is carried out at a long physical distance from the welding pin tip 7 in the friction stir welding head.

These measurement uncertainties lead to positioning inaccuracy of the welding pin 4 in particular in the vertical direction, that is to say parallel to the z-axis of the coordinate system 2 which, as mentioned further above, can have a negative influence on the quality of the weld bead, for example as a result of the creation of "LOP" faults. These faults are intended to be detected by means of the friction stir welding head according to the invention in order, at least in some cases, to possibly render subsequent material investigations for quality assurance, by means of ultrasound or using eddy currents, superfluous.

In order to detect the occurrence of such faults, the welding pin section 4a is, in one embodiment variant, a reflector in the form of a cylindrical disc 18. The disc 18 is, for example, firmly connected to the welding pin 4, such that they rotate together, by three attachment means, for example in the form of grub screws with a hexagonal recess, or the like.

The welding pin 4 for this purpose has a circumferential annular groove, which is not illustrated in FIG. 1, in the end area, into which the attachment means can be introduced in order to attach the disc 18 to the welding pin 4. The disc 18 has at least two threaded holes through it, into which the attachment means can be screwed, thus allowing the disc 18 to be firmly clamped in the circumferential annular groove in the welding pin 4. The attachment means, only one of which 19 is shown in the illustration in FIG. 1, are arranged distributed around the circumference of the disc 18. The disc 18 for example has three threaded holes through it, each arranged with an offset of 120° over the circumference of the disc 18, into which a corresponding number of attachment means, in particular in the form of grub screws, can be screwed. In the illustrated exemplary embodiment, the shoulder tool 5 likewise has three elongated holes for the attachment means to pass through, only one elongated hole 20 of which is shown in the illustration in FIG. 1. The three elongated holes are likewise each arranged at an interval of 120° from one another around the circumference of the shoulder tool 5. The elongated holes 20 allow vertical movement of the welding pin 4 with the disc 18 attached to it, in the direction of the direction arrow 21 (z-axis), and therefore readjustment of the distance 15 during the welding process. A different number of attachment means and threaded holes for them to pass through, as well as a number of elongated holes corresponding to them, are likewise possible. During operation of the friction stir welding head, both the welding pin 4 together with the disc 18 attached to it and the shoulder tool 5 always rotate in synchronism at the same speed, so that there is no friction between these components.

Furthermore, a first and a second laser rangefinder 22, 23 are arranged in the area of the housing 1, and allow high-precision distance measurements. The two laser rangefinders 22, 23 are attached directly to the housing 1 by means of suitable attachment systems, for example by means of chamfered sheet-metal strips. The laser rangefinders 22, 23 are arranged firmly on the housing 1, while the shoulder tool 5 and the welding pin 4 are held on the welding head such that they can rotate on a spindle, which is not shown in any more detail in the drawing, and rotate at a high rotation speed during the welding process. The first laser rangefinder 22 can be used to determine a first distance 24 between the first laser rangefinder 22 and an upper face 26 of the disc 18. The second rangefinder 23 is used analogously to determine a second distance 25 between the housing 1 and the work piece upper face 12.

The distance 15 can be determined exactly by means of an open-loop and closed-loop control device, which is not illustrated, from the first distance 24 and the second distance 25 in conjunction with the position value of the friction stir welding head, as determined by the position sensor 17, in the direction of the z-axis and if necessary can be corrected by means of the gantry arrangement of the friction stir welding apparatus. In this case, the distance 15 can be measured by means of the friction stir welding head according to the invention with an accuracy of about ±0.05 mm, for quality assurance purposes, and if necessary can be kept constant in order to ensure that the quality of the friction stir weld bead that is produced is high. The determination of the distance 15 is dependent on the precise material thickness 27 of the work pieces 9, 10 as well as the precise geometric data of the friction stir welding head and of the gantry arrangement each being known. Furthermore, the illustration in FIG. 1 is based on the assumption that both work pieces 9, 10 have the same material thickness 27, within the range of permissible tolerance discrepancy.

Ideally, the disc 18 is always aligned exactly at right angles to the longitudinal axis 6. Accurate alignment of the disc 18 with respect to the welding pin 4 can be achieved by means of the three attachment means, which are for example each arranged with an offset of 120° over the circumference of the disc 18. Nevertheless, the disc 18 will always carry out a tumbling movement, even if this is small, while the welding pin 4 is rotating about the longitudinal axis 6. This unavoidable tumbling movement results in the distance 24 determined by the first laser rangefinder 22 having a sinusoidal profile. The measurement uncertainty resulting from this can be eliminated by suitable filter algorithms, for example in the form of an averaging process.

The laser rangefinders 22, 23 operate on the reflection principle. The laser radiation emitted by the first and second laser rangefinders 22, 23 is reflected on the upper face 26 of the disc 18 or the work piece upper face 12, respectively, and is reflected back to the relevant laser rangefinder 22, 23. The respective distance can be determined in a manner known per se by measuring the delay time of the laser radiation, in conjunction with the speed of light in air. The measurement of the distances 24, 25 allows the relative position of the welding pin 4 to be determined exactly in the vertical direction (z-axis). This makes it possible to identify and if necessary compensate for a thermally dependent change in the length of the welding pin 4 and any change which may possibly occur in the geometry of the guidance apparatus for the friction stir welding head.

Before the start of the friction stir welding process, the desired or required nominal value is first of all set for the distance 15 between the welding pin tip 7 and the work piece rest 16. The laser rangefinders 22, 23 are then zeroed. If, for example, the welding pin 4 is now heated by the friction stir welding process, then this leads to a slight increase in the length of the welding pin 4 as a result of thermal expansion, and the predetermined nominal value of the distance 15 is undershot. This change is detected by the first laser rangefinder 22, by measuring the distance 24. In order to reset the distance 15 to the nominal value, the welding pin 4 can be raised in the vertical direction, that is to say parallel to the z-axis (direction arrow 21). If, in contrast, the distance 15 is greater than the predetermined nominal value, then the welding pin 4 can be lowered again until the nominal value is reached. This change in length is also detected by the first laser rangefinder 22, by measuring the distance 24. The second laser rangefinder 23 can be used to detect the distance 25 between the work piece upper faces 12, 13 and the welding head or the second laser rangefinder 23 and, furthermore, the second laser rangefinder 23 can be used to detect any changes in the geometry of the gantry arrangement for guidance of the friction stir welding head. The readjustment of the vertical position of the welding pin can be regarded as optional. Continuous monitoring of changes in the distance 15 is sufficient for quality assurance of the friction stir welded joint.

Any change in the distance 15 between the welding pin tip 7 and the work piece rest 16 can be detected just by the first laser rangefinder 22 on its own. However, the second distance 25, which is provided by the second laser rangefinder 23, and, if necessary, the position value of the welding pin 4 or of the friction stir welding head, produced by the position measurement unit 17 in the CNC control system, parallel to the z-axis, as well as further installation dimensions must, however, also be included in order to determine the absolute distance 15.

Furthermore, the measured distances 24, 25 are converted on the basis of the inclined position of the laser rangefinders 22, 23 (see FIG. 1) in order to determine the "true" distances in the vertical direction (parallel to the z-axis). This conversion can be avoided by the laser radiation emitted by the laser rangefinders 22, 23 being emitted exactly parallel to the z-axis. The calculations mentioned above are for example carried out by means of the open-loop and closed-loop control device, which is generally a part of the CNC control system that is provided in any case for the gantry arrangement.

The friction stir welding head according to the invention primarily allows precise detection of the distance 15 between the welding pin tip 7 and the work piece rest 16 or the backing, with an accuracy of up to ±0.05 mm, for quality assurance of the friction stir weld bead that is produced. If desired, the distance 15 can also be kept constant by appropriately driving the actuating elements of the gantry arrangement using suitable control algorithms, and by using the distance measured values 24, 25 determined by the laser rangefinders 22, 23. In order to achieve a measurement which is as accurate as possible while largely precluding the aforementioned errors, the disc 18 is mounted as far downwards as possible at the end of the welding pin 4, in a lower area 28.

The laser radiation emitted by the laser rangefinders 22, 23, as shown in FIG. 1, does not strike the upper face 26 of the disc 18 or the work piece upper face 12 at right angles. The measured distances 24, 25 must therefore be trigonometrically converted in order to determine the distances parallel to the z-direction. Contrary to the illustration shown in FIG. 1, the rangefinders 22, 23 are for example arranged such that the incidence angle of the laser radiation emitted by the laser rangefinders 22, 23, and therefore also the reflection angle of the laser radiation reflected from the upper face 26 of the disc 18 or, respectively, from the work piece upper face 12, is in each case exactly 90°, so that there is no need for subsequent conversion of the measured distances. At the same time, this arrangement achieves an optimum reflection effect. If it is not possible to arrange the laser rangefinders 22, 23 in this way in the area of the friction stir welding head, for example because of design constraints, then the laser rangefinders 22, 23 should be arranged at least such that the value of the incidence angle and reflection angle in each case differs only to a small extent from 90°.

The welding pin section 4a may also be in an integral form, with a circumferential shoulder or groove incorporated in the welding pin 4, or may be in the form of a raised ring.

Figure 2:
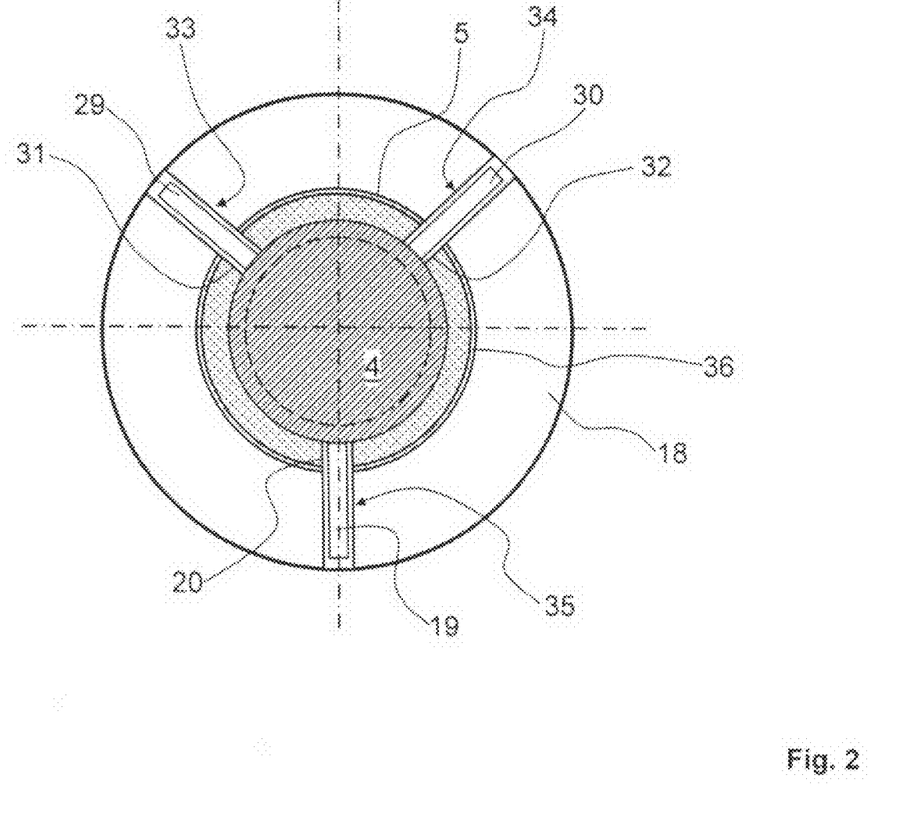
FIG. 2 shows a section along the line II-II in FIG. 1.

FIG. 2 illustrates a longitudinal section along the section II-II through the disc 18 as illustrated in FIG. 1.

The welding pin 4 with a circular cross-sectional geometry is coaxially surrounded by the shoulder tool 5. Seen from above, the disc 18 has a geometry in the form of a circular ring. The disc 18 is connected to the welding pin 4, such that they rotate together, by three attachment means 19, 29, 30. The attachment means 19, 29, 30 are each arranged offset through 120° with respect to one another in the disc 18 in the illustrated exemplary embodiment. The shoulder tool 5 has the three elongated holes 20, 31 and 32 for the attachment means 19, 29, 30 to pass through. Grub screws with a recessed internal hexagon are for example used as the attachment means 19, 29, 30, which have a high tightening torque and also occupy little space. Furthermore, the disc 18 has three threaded holes 33, 34, 35 through it, which are each arranged offset through 120° with respect to one another, into which the attachment means 19, 29, 30 can be screwed. In order to attach the disc 18 to the welding pin 4, the latter has a circumferential annular groove 36 into which the attachment means 19, 29, 30 can be screwed in order to clamp the disc 18 firmly on the welding pin 4.

Other attachment options are feasible, other than the described attachment of the disc 18 to the welding pin 4. For example, the disc 18 can be clamped or locked in some other way on the welding pin 4. From the mechanical point of view, the attachment of the disc 18 to the welding pin 4 is not subject to any particularly stringent requirements, since the distance between the housing 1 of the friction stir welding head and the upper face 26 of the disc 18 is detected by the rangefinder 22 without any contact being made.

By way of example, the disc 18 can also be formed using a plastic material with metallic vapor deposition for reflection of the laser radiation. A small mechanical clearance is provided on the circumference between the disc 18 and the shoulder tool 5, in order to avoid measurement errors resulting from thermal expansion of the shoulder tool 5.

Figure 3:
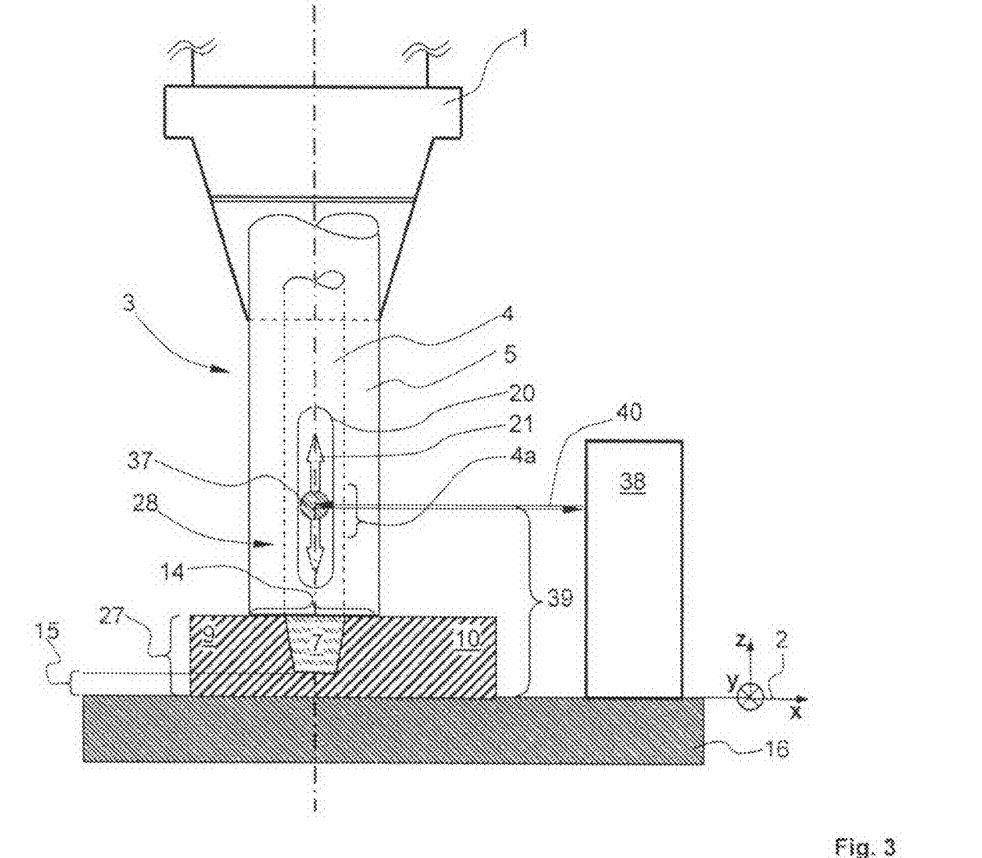
FIG. 3 shows a second embodiment variant of the friction stir welding head.

FIG. 3 shows a further embodiment variant of the friction stir welding head.

The welding pin 4 is once again held centrally in the shoulder tool 5 in order to form the welding tool 3. Both the welding pin 4 and the shoulder tool 5 are clamped in a chuck or in a spindle, such that they can rotate, in the housing 1. In the illustrated exemplary embodiment, the shoulder tool 5 has three elongated holes, only the front elongated hole 20 of which is shown in the illustration in FIG. 3. The elongated holes are once again for example offset uniformly through 120° around the circumference of the shoulder tool 5. It is likewise possible for there to be a different number of elongated holes and an arrangement that differs from this. Furthermore, instead of the elongated holes, it is also possible to provide recesses with an opening geometry that is not oval. The work pieces 9, 10 have a material thickness 27 and are firmly clamped on the work piece rest 16 by clamping means that are not illustrated. The welding pin tip 7 is located at the lower end of the welding pin 4 and is guided, such that it rotates, by the material of the work pieces 9, 10, which has become plastic as a result of the friction heat that is produced, in the bead formation area 14, in order to produce the friction stir weld bead. The coordinate system 2 illustrates the orientation of the x-axis, y-axis and z-axis in space. The welding pin 4 is located at the distance 15 from the work piece rest 16 or the backing.

The major items relating to the design and operation of the actual friction stir welding head therefore correspond to those of the friction stir welding head described in FIG. 1.

The welding pin section 4a is in the form of an optical reflector 37 in this embodiment variant. In the illustrated exemplary embodiment, the reflector 37 is circular (curved circular surface). However, the reflector 37 can also surround the welding pin 4 in an annular shape (cylindrical casing surface) in order to ensure uniform scanning, apart from the periodic coverage by the rotating shoulder tool 5, with respect to a laser tracker 38 which is fixed with respect to it. By way of example, the reflector 37 may be formed by a flexible, reflective sheet which is adhesively bonded to the welding pin 4, or is attached to it in some other way. In this case, a circle is stamped out of the sheet and is then adhesively bonded to the welding pin 4, or is applied to it in some other way. The reflector 37 can also be formed by local metallic vapor deposition on the welding pin 4, a coating or the like. Alternatively, the reflector can also be produced by polishing areas of the welding pin section 4a. The attachment or the configuration of the reflector are subject to stringent requirements because of the high temperatures which occur in the area of the welding pin 4.

The laser tracker 38, which is arranged directly on the work piece rest 16 as a reference system, can be used together with the optical reflector 37 at least to determine the distance 39 between the reflector 37 and the work piece rest 16, directly. The distance 15 between the welding pin 4 and the work piece rest 16 or the backing can be determined directly from the distance 39 in conjunction with the known position of the reflector 37, the length of the welding pin 4 including the welding pin tip 7, and the material thickness 27 of the work pieces 9, 10. In contrast to the embodiment shown in FIG. 1, no additional distance measurement, which would increase the measurement uncertainty, is required between the housing 1 of the friction stir welding head and the work pieces 9, 10 or the work piece upper faces 12, 13. Furthermore, there is no need to evaluate the position sensor 17 from the CNC control system for the friction stir welding apparatus for the direction of the z-axis.

The position of the welding pin tip 7 parallel to the z-axis in the vertical direction can be readjusted, if required, on the basis of the current absolute distance 15, in order to keep the distance 15 constant with an accuracy of up to ±0.05 mm of a predetermined nominal value.

The laser tracker 38 allows direct measurement of the distance 39, and not only indirect measurement of the distance 40 between the reflector 37 and the laser rangefinder 38. The laser radiation emitted by the laser tracker 38 essentially runs parallel to the xy-plane. The elongated holes in the shoulder tool 5 are in this case absolutely essential in order to ensure at least periodic scanning of the optical reflector 37 by means of the laser tracker 38 as a consequence of the synchronous rotation of the welding pin 4 and of the shoulder tool 5, independently of any vertical movements of the welding pin 4.

Figure 4:
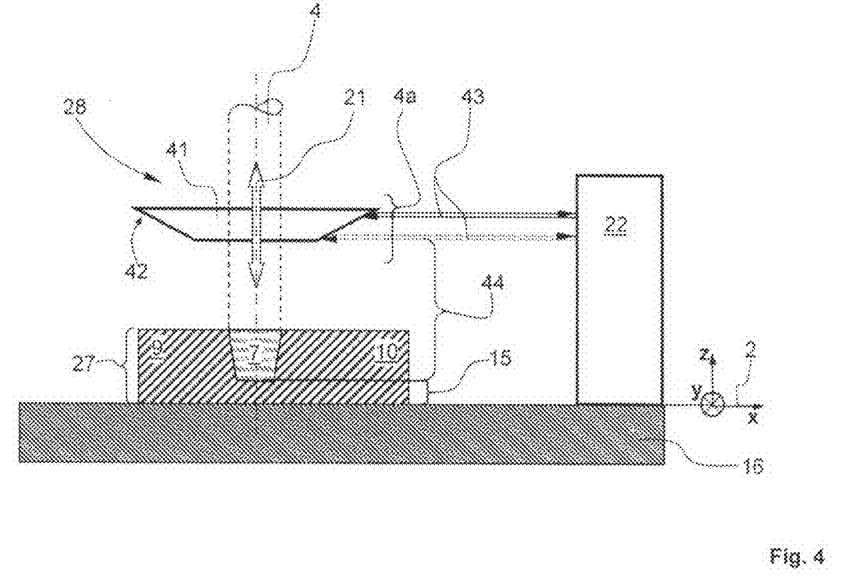
FIG. 4 shows a further embodiment variant of the friction stir welding head.

FIG. 4 shows a further embodiment variant of the friction stir welding head. In contrast to the embodiment shown in FIGS. 1, 2, a conical disc 41 is mounted on the welding pin 4 in order to form the welding pin section 4a. The welding pin tip 7 is located in the work pieces 9, 10, that is to say in the welding position. The two work pieces 9, 10 each have the material thickness 27. The coordinate system 2 illustrates the position of the x-axis, y-axis and z-axis in space.

The disc 41 may be attached to the welding pin 4 in the same manner as in the embodiment of the disc 18 shown in FIG. 1. In particular, the disc 41 is likewise mounted in the lower area of the welding pin 4 by means of an annular groove, into which attachment means for firmly clamping the disc 41 can be introduced. Furthermore, there is a small circumferential gap between the disc 41 and the shoulder tool 5 in order to avoid thermally dependent stresses and measurement uncertainties caused by them. Alternatively, the disc 41 can also be formed with a cylindrical base body, which is mounted on the welding pin 4 in a corresponding manner to the disc 18 (see FIGS. 1, 2). A conical ring is then pressed onto, clamped onto or mounted in some other way on the cylindrical base body in order to form the inclined edge.

In contrast to the disc 18 shown in FIG. 1, the disc 41 is, however, conical and not cylindrical, that is to say the disc 41 has an inclined, conical edge 42. The disc 41 is therefore approximately in the geometric form of a low truncated cone with a central hole for the welding pin 4 to pass through. The shoulder tool is not illustrated in FIG. 4, for clarity reasons.

When the welding pin 4 with the disc 41 attached to it moves upwards and downwards parallel to the direction arrow 21 and the z-axis, the distance 43 between the edge 42 and the first laser rangefinder 22, which is arranged directly on the work piece rest 16 in this case, decreases or increases owing to the cone angle of the disc 41, and corresponding to the inclination angle of the inclined edge 42. Since, in contrast to the first embodiment variant, the first laser rangefinder 22 is arranged directly on the work piece rest 16 as a reference point, its position is known in the coordinate system 2. The laser radiation emitted by the first laser rangefinder 22 runs parallel to the xy-plane. If the disc 41 in FIG. 4 is moved parallel to the z-axis upwards, then the distance 43 increases, as illustrated by the two dotted arrows. The opposite situation occurs when the welding pin 4 with the disc 41 is moved downwards. If the inclination angle or inclination of the edge 42 with respect to the x-axis is, for example, 45°, then, if the disc 41 is raised by an amount of 0.1 mm, the distance 43 is increased by 0.1 mm, and vice versa. The smaller the inclination angle that is chosen for the edge 42, the greater is the measurable change in the distance 43 in this case in comparison to the magnitude of the vertical movement of the disc 41 parallel to the z-axis.

The laser radiation which is emitted by the first laser rangefinder 22 in order to measure the distance 43 in this case always runs parallel to the xy-plane, that is to say to the work piece rest 16 (see the coordinate system 2). The arrows to illustrate the distance 43 are shown slightly offset with respect to one another, just in order to improve the clarity of the drawing. In reality, all that exists is the laser radiation emitted by the laser rangefinder 22 and reflected back from the conical edge 42. The laser radiation emitted by the laser rangefinder 22 is in each case reflected only at different points on the inclined edge 42, as a function of the vertical position of the disc 41. First of all, any change in the height 44 of the disc 41 with respect to the work piece rest 16 can be determined from the distance 43 just by geometric considerations. If the initial distance 15 between the backing and the welding pin tip 7 is known, this can then be used to determine the current absolute distance 15 between the welding pin tip 7 and the work piece rest 16.

In contrast to the embodiment variant shown in FIG. 3, no complex laser tracker is required. In fact, any change in the vertical position of the disc 41 is determined indirectly via the cone angle of the edge 42 of the disc 41 by a horizontal distance measurement between the conical edge 42 of the disc 41 and the first laser rangefinder 22. In comparison to the embodiment shown in FIG. 3, the arrangement shown in FIG. 4 can admittedly not achieve such good measurement accuracy, but this is done with considerably less complexity. The laser radiation emitted by the laser rangefinder 22 must be readjusted when the welding pin 4 is moved along the weld bead, in order to achieve reflection from the conical edge 42 in each case. This can be done, for example, by pivoting the laser rangefinder 22 on the work piece rest 16 about the z-axis, or by readjustment of the laser rangefinder 22 parallel to the welding pin 4 (parallel to the xy-plane).

What is claimed is:

1. A friction stir welding head comprising:
a housing, a workpiece rest, a welding tool comprising: a rotating welding pin comprising a reflector, and a rotating shoulder tool for welding workpieces, which rest on the workpiece rest, wherein the shoulder tool, which rotates in synchronism with the welding pin, coaxially surrounds the welding pin, and a first laser rangefinder attached to the housing or the workpiece rest, wherein the first laser rangefinder faces towards the reflector of the welding pin and is orientated for sending a laser beam to the reflector, and the reflector is orientated for reflecting the laser beam back to the first rangefinder.

2. The friction stir welding head according to claim 1, wherein a second laser rangefinder can be used to measure a second distance between the housing and one of the workpiece upper faces.

3. The friction stir welding head according to claim 2, wherein any change in an absolute distance between the welding pin tip and the workpiece rest can be determined from the first distance by using an open-loop and closed-loop control device and the second distance by using the open-loop and closed-loop control device.

4. The friction stir welding head according to claim 3, wherein the absolute distance between the welding pin tip and the workpiece rest can be determined.

5. The friction stir welding head according to claim 1, wherein the first laser rangefinder is arranged directly on the workpiece rest, and the welding pin section comprises a reflector in the form of a conical disc which is arranged on the welding pin, and wherein the conical disc comprises a conical edge which reflects laser radiation emitted in the horizontal direction by the first laser rangefinder.

6. The friction stir welding head according to claim 5, wherein any change in an absolute distance between the welding pin tip and the workpiece rest can be determined from the first distance between the conical edge and the first laser rangefinder by using an open-loop and closed-loop control device.

7. A friction stir welding head comprising:
a stationary housing, a workpiece rest, a welding tool comprising:
a rotating welding pin comprising a welding pin section formed as a reflector and a welding pin tip, and a rotating shoulder tool for welding workpieces which rest on a workpiece rest, wherein the shoulder tool, which rotates in synchronism with the welding pin, coaxially surrounds the welding pin, and a laser tracker faces towards the reflector of the welding pin and is orientated for sending a laser beam to the reflector, and the reflector is orientated for reflecting the laser beam back to the laser tracker.

8. The friction stir welding head according to claim 7, wherein the welding pin section comprises at least one reflector for reflection of laser radiation emitted by the laser tracker, and the shoulder tool has at least one elongated hole for transmission of the laser radiation emitted by the laser tracker.

9. The friction stir welding head according to claim 8, wherein the at least one reflector is arranged in a lower area of the welding pin.

* * * * *